(12) United States Patent
Liu et al.

(10) Patent No.: US 11,460,709 B2
(45) Date of Patent: Oct. 4, 2022

(54) METHOD AND APPARATUS FOR ADJUSTING ON-VEHICLE PROJECTION

(71) Applicant: BAIDU ONLINE NETWORK TECHNOLOGY (BEIJING) CO., LTD., Beijing (CN)

(72) Inventors: Yi Liu, Beijing (CN); Zhipeng Zhou, Beijing (CN)

(73) Assignee: Apollo Intelligent Connectivity (Beijing) Technology Co., Ltd., Beijing (CN)

( * ) Notice: Subject to any disclaimer, the term of this patent is extended or adjusted under 35 U.S.C. 154(b) by 0 days.

(21) Appl. No.: 16/817,512

(22) Filed: Mar. 12, 2020

(65) Prior Publication Data

US 2020/0292832 A1    Sep. 17, 2020

(30) Foreign Application Priority Data

Mar. 14, 2019 (CN) .......................... 201910194154.1

(51) Int. Cl.
| G02B 27/01 | (2006.01) |
| G06F 3/01 | (2006.01) |
| G06T 11/00 | (2006.01) |
| B60K 35/00 | (2006.01) |

(52) U.S. Cl.
CPC ......... *G02B 27/0179* (2013.01); *G06F 3/013* (2013.01); *G06T 11/00* (2013.01); *B60K 35/00* (2013.01); *B60K 2370/1529* (2019.05); *B60K 2370/177* (2019.05); *B60K 2370/736* (2019.05); *G02B 2027/0187* (2013.01)

(58) Field of Classification Search
CPC ...................................................... G06F 3/013
USPC ............................................................ 345/633
See application file for complete search history.

(56) References Cited

U.S. PATENT DOCUMENTS

| 2005/0046584 A1* | 3/2005 | Breed | B60N 2/0232 340/13.31 |
| 2006/0208169 A1* | 9/2006 | Breed | G06K 9/00624 250/221 |
| 2009/0303158 A1* | 12/2009 | Takahashi | G02B 27/0093 345/7 |

(Continued)

FOREIGN PATENT DOCUMENTS

| CN | 103728727 A | 4/2014 |
| CN | 104260669 A | 1/2015 |

(Continued)

OTHER PUBLICATIONS

"HyHOPE: Hybrid Head Orientation and Position Estimation for Vision-based Driver Head Tracking" Erik Murphy-Chutorian et al., 2008 IEEE Intelligent Vehicles Symposium.*

(Continued)

*Primary Examiner* — Javid A Amini
(74) *Attorney, Agent, or Firm* — Lathrop GPM LLP

(57) ABSTRACT

Embodiments of the present disclosure provide a method and an apparatus for adjusting on-vehicle projection, a device, and a storage medium. The method includes the following features. A face image of the driver captured by the on-vehicle imager is obtained. A projection position of an on-vehicle projection device is determined based on the face image of the driver, a parameter of the on-vehicle imager and an installation position of the on-vehicle projection device.

11 Claims, 2 Drawing Sheets

(56) References Cited

U.S. PATENT DOCUMENTS

| | | | | |
|---|---|---|---|---|
| 2010/0014711 | A1* | 1/2010 | Camhi | B60Q 3/80 382/104 |
| 2014/0160012 | A1* | 6/2014 | Su | G06K 9/00845 345/156 |
| 2014/0268353 | A1* | 9/2014 | Fujimura | G02B 27/01 359/630 |
| 2014/0362195 | A1* | 12/2014 | Ng-Thow-Hing | G06F 3/04815 348/51 |
| 2015/0062168 | A1* | 3/2015 | Ng-Thow-Hing | G06F 3/017 345/633 |
| 2015/0103408 | A1* | 4/2015 | Nishima | G02B 27/0101 359/618 |
| 2015/0239398 | A1* | 8/2015 | Kaplan | B60R 1/025 701/49 |
| 2015/0356772 | A1* | 12/2015 | Osterhout | G09G 5/003 345/633 |
| 2016/0003636 | A1* | 1/2016 | Ng-Thow-Hing | G08G 1/167 701/26 |
| 2016/0084661 | A1* | 3/2016 | Gautama | G01C 21/365 701/400 |
| 2016/0291330 | A1* | 10/2016 | Kurokawa | A61B 3/113 |
| 2016/0377873 | A1* | 12/2016 | Kimura | G06K 9/00832 345/682 |
| 2016/0379498 | A1* | 12/2016 | Aoki | G09G 3/001 340/436 |
| 2017/0050542 | A1* | 2/2017 | Shigeta | G02B 27/0149 |
| 2017/0299873 | A1* | 10/2017 | Hickerson | G02B 27/0093 |
| 2018/0043829 | A1* | 2/2018 | Cordell | G08G 1/143 |
| 2018/0096475 | A1* | 4/2018 | Jemander | G01S 15/58 |
| 2018/0231775 | A1* | 8/2018 | Kawana | G02B 27/0101 |
| 2019/0101751 | A1* | 4/2019 | Chou | G09G 5/14 |
| 2019/0129171 | A1* | 5/2019 | Narushima | B60K 35/00 |
| 2019/0235241 | A1* | 8/2019 | Suzuki | B60R 11/02 |
| 2020/0225472 | A1* | 7/2020 | Aoki | B60K 37/06 |
| 2020/0290458 | A1* | 9/2020 | Sunaga | G02B 27/0093 |

FOREIGN PATENT DOCUMENTS

| | | |
|---|---|---|
| CN | 204586669 U | 8/2015 |
| CN | 105774679 A | 7/2016 |
| CN | 106226910 A | 12/2016 |
| CN | 106353886 A | 1/2017 |

OTHER PUBLICATIONS

Chinese Patent Application No. 201910194154.1 English translation of First Office Action dated Sep. 9, 2020, 9 pages.
Chinese Patent Application No. 201910194154.1 First Office Action dated Sep. 9, 2020, 9 pages.

* cited by examiner

METHOD AND APPARATUS FOR ADJUSTING ON-VEHICLE PROJECTION

CROSS REFERENCE TO RELATED APPLICATIONS

This application claims priority and benefits of Chinese Application No. 201910194154.1, filed on Mar. 14, 2019, the entire content of which is incorporated herein by reference.

FIELD

Embodiments of the present disclosure relate to the field of head-up display technology, and more particularly, to a method and an apparatus for adjusting on-vehicle projection, a device, and a storage medium.

BACKGROUND

With development of head-up display technology and reduction of cost, a head-up display technology has transitioned from being a high-tech configuration in aviation field only (e.g., fighter jets and civil aircrafts) to being widely used in the automobile industry and is expected to become a standard device in consumer vehicles in the next few years. A main function of the head-up display is to project data on the dashboard and driving data onto the front windshield, such that a projected virtual image and a driving scene overlap with each other to produce an augmented reality (AR) effect.

SUMMARY

Embodiments of the present disclosure provide a method for adjusting on-vehicle projection. The method includes: obtaining a face image of a driver captured by an on-vehicle imager; and determining a projection position of an on-vehicle projection device based on the face image of the driver, a parameter of the on-vehicle imager and an installation position of the on-vehicle projection device.

Embodiments of the present disclosure also provide a device. The device includes one or more processors and a storage device. The storage device is configured to store one or more programs. When the one or more programs are executed by the one or more processors, the one or more processors are caused to implement a method for adjusting on-vehicle projection according to any one of embodiments of the present disclosure.

Embodiments of the present disclosure also provide a computer readable storage medium, having a computer program stored thereon. When the computer program is executed by a processor, the processor is configured to implement a method for adjusting on-vehicle projection according to any one of embodiments of the present disclosure.

BRIEF DESCRIPTION OF THE DRAWINGS

In order to explain the technical solution of embodiments of the present disclosure more clearly, the accompanying drawings used in embodiment s will be briefly introduced below. It should be understood that, the accompanying drawings merely illustrate some embodiments of the present disclosure, and therefore should not be considered as a limitation for the scope. For the skilled in the art, other related accompanying drawings may also be obtained according to these accompanying drawings without any creative labor.

DETAILED DESCRIPTION

Detailed description will be further provided below to embodiments of the present disclosure with reference to the accompanying drawings and the embodiments. It should be understood that, detailed embodiments described herein are intended only to explain the present disclosure, and are not intended to limit the present disclosure. In addition, it should be further noted that, for the convenience of description, only some contents but not all of the structure related to the present disclosure are illustrated in the accompanying drawings.

Different drivers, especially those with different heights, correspond to different optimal ranges of angles of view. Presently, two ways of projection may exist. One is a hardware design mode, designing the head-up display and fixing projection parameters based on a head range or eye range of drivers. The other is a manual adaptation mode, manually adjusting, by the driver, a light machine to a satisfactory viewing position before using the light machine, and remaining the light machine unchanged until a next manual adjustment.

However, the hardware design mode has the following disadvantages. It is unable to obtain a best viewing experience while allowing a normal observation of the driver. In addition, it is unable to adjust a projection position of an AR virtual image. The manual adaptation mode has following disadvantages. It is difficult for the driver to determining the best projection position of the AR virtual image even in a case of manual adjustment, since there is usually no road information when parking, for example, there is also no navigation guidance information in a parking lot, thereby affecting driving experience.

Therefore, the present disclosure provides a method and an apparatus for adjusting on-vehicle projection, a device, and a storage medium, which may adjust the projection of the head-up display to automatically adapt to a field of view of a driver, such that the projection of the head-up display is within an optimal range of angles of view of the driver.

With the method and the apparatus, the face image of the driver is obtained, and the projection position of the on-vehicle projection device is determined based on the face image of the driver, the parameter of the on-vehicle imager and the installation position of the on-vehicle projection device, thereby realizing to adjust the projection of the head-up display to automatically adapt to the field of view of the driver, such that the projection of the head-up display is within the optimal range of angles of view of the driver.

Figure 1:
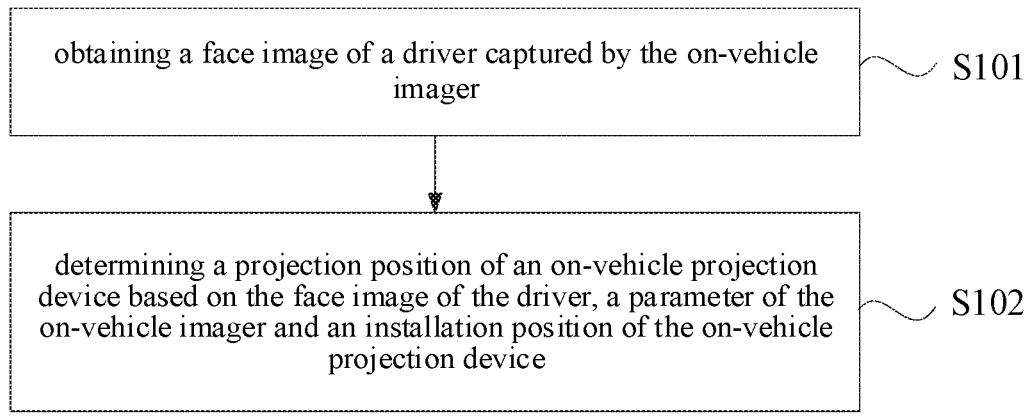
FIG. 1 is a flow chart illustrating a method for adjusting on-vehicle projection according to embodiments of the present disclosure.

FIG. 1 is a flow chart illustrating a method for adjusting on-vehicle projection according to embodiments of the present disclosure. Embodiments illustrated as FIG. 1 may be applicable to a case where data of a dashboard and driving data are projected by a head-up display for viewing by a driver. The method may be executed by a vehicle disposed with an on-vehicle imager. A capturing direction of the on-vehicle imager faces toward a driver seat. The method may include the following.

At block S101, a face image of a driver captured by the on-vehicle imager is obtained.

The imager may include a device such as a video camera, a camera and a webcam, which is disposed in front of a driver's seat and configured to capture a face image of the driver. A rotation angle and a translation amount of the imager relative to a forward horizontal direction of the vehicle are fixed when being installed. A format of the face image of the driver may include, but be not limited to, a JEPG format, a BMP format, and a PNG format.

In detail, the face image of the driver captured by the on-vehicle imager may be obtained in real time while the vehicle is travelling. The face image of the driver may also be captured after a vision adjustment request is monitored. By obtaining the face image of the driver, a data basis may be provided for a subsequent determination of projection parameters of an on-vehicle projection device.

At block S102, a projection position of the on-vehicle projection device is determined based on the face image of the driver, a parameter of the on-vehicle imager and an installation position of the on-vehicle projection device.

The parameter of the on-vehicle imager may include an internal parameter and an external parameter. The internal parameter and the external parameter may be obtained by a linear calibration method, a non-linear optimization calibration method and a two-step calibration method. In detail, the internal parameter may include such as a focal length, a main point, a deflection coefficient, and a distortion. The external parameter may be used to describe a relationship between a camera coordinate system and a world coordinate system. The external parameter may include rotational parameters and translational parameters. The installation position of the on-vehicle projection device may include a top position or a central control position inside the vehicle. The on-vehicle projection device may be configured to project an image onto a front windshield of the vehicle at any height and any angle within a measuring range.

In detail, three-dimension coordinates of facial feature points of the driver and a three-dimension directional vector of a head posture of the driver may be determined based on the image coordinates of the facial feature points of the driver and the parameter of the on-vehicle imager. A target intersection position of a direction of the head posture starting from an eye position of the driver and an on-vehicle front windshield may be determined. The projection position of the on-vehicle projection device may be determined based on the target intersection position. The projection position may include a projection height and/or a projection angle.

In a procedure for determining the projection parameter of the on-vehicle projection device based on the face image of the driver, a computing power of a vehicle system, as well as a computing power of a server may be used to determine the projection parameter of the on-vehicle projection device based on the face image of the driver. Comparing with a manual adjustment method of determining the projection parameter of the on-vehicle projection device, the adjustment efficiency for the projection parameter may be improved, thereby realizing an automatic adjustment of the projection of the head-up display for different drivers, such that the projection of the head-up display may be within an optimal range of angels of view of the driver.

With the technical solution according to embodiments of the present disclosure, the face image of the driver may be obtained, and the projection position of the on-vehicle projection device may be determined based on the face image of the driver, the parameter of the on-vehicle imager and the installation position of the on-vehicle projection device. Therefore, there is no need of manual adjustment by the driver. In addition, for different drivers, the projection of the head-up display may be automatically adapted to a field of view of the driver, such that the projection of the head-up display may be within the optimal range of angles of view of the driver.

Figure 2:
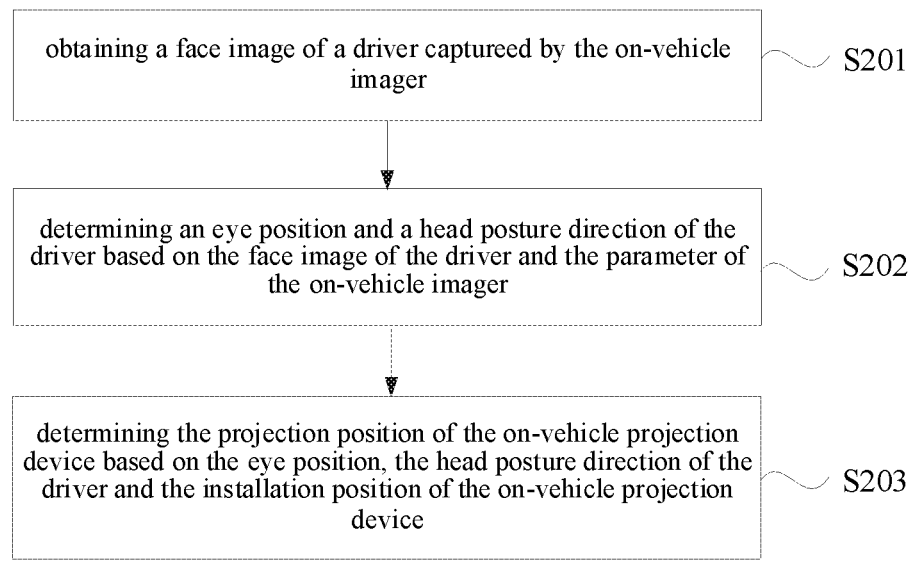
FIG. 2 is a flow chart illustrating a method for adjusting on-vehicle projection according to embodiments of the present disclosure.

FIG. 2 is a flow chart illustrating a method for adjusting on-vehicle projection according to embodiments of the present disclosure. Embodiments of the present disclosure provide details implementations on a basis of the above embodiments. The method may be executed by a vehicle disposed with an on-vehicle imager. A capturing direction of the on-vehicle imager faces toward a driver seat. The method may include the following.

At block S201, a face image of a driver captured by the on-vehicle imager is obtained.

At block S202, an eye position and a head posture direction of the driver are determined based on the face image of the driver and the parameter of the on-vehicle imager.

The eye position of the driver refers to three-dimension coordinates of the driver's eye in the world coordinate system. The head posture direction of the driver refers to a posture of the head of the driver relative to three coordinate axes in the world coordinate system. For example, the head faces toward the upper left, the upper right or the lower left.

In an example, the block S202 may include the following.

A. Image coordinates of facial feature points of the driver are determined based on the face image of the driver.

The facial feature points may include eyebrows, eye sockets, pupils, inner and outer eye corners, a bridge of a nose, a tip of a nose, lips, a chin, cheeks, etc. The image coordinates of the facial feature points refer to two-dimension image coordinates of the facial feature points.

In detail, a face frame of the driver is obtained by recognizing the obtained face image of the driver through a face detection algorithm, to further obtain an image coordinate of each pixel on the face frame of the driver. In an example, the face detection algorithm may include a geometric feature-based method, a local feature analysis method, an eigenface method, etc. After the face frame of the driver and the image coordinate of each pixel on the face frame are obtained, a detection algorithm of the facial feature point is operated within the face frame to obtain the image coordinate of each facial feature point. In an example, the detection algorithm of the facial feature point may include an active shape model (ASM), an active appearance model (AAM), a cascaded pose regression (CPR) and the like.

B. Three-dimension coordinates of the facial feature points of the driver and a three-dimension directional vector of the head posture of the driver are determined based on the image coordinates of the facial feature points of the driver and the parameter of the on-vehicle imager.

In detail, the three-dimension coordinates of the facial feature points of the driver may be obtained based on the calibrated internal parameter and the calibrated external parameter of the on-vehicle imager and the obtained image coordinates of the facial feature points of the driver by utilizing a perspective n-point positioning method, that is, through an equation m'=A×[R|t]×M', where, m' represents the image coordinate of the facial feature point of the driver, A represents the internal parameter of the on-vehicle imager, [R|t] represents the external parameter of the on-vehicle imager, R represents the rotational parameter in the external parameter of the on-vehicle imager, t represents the translational parameter in the external parameter of the on-vehicle imager, M' represents the three-dimension coordinate of the facial feature point of the driver. A three-dimension profile of the face of the driver may be obtained based on the three-dimension coordinates of the facial feature points of the driver. In addition, the head posture of the driver may be determined based on the three-dimension profile.

After the three-dimension coordinate of the facial feature point of the driver is obtained, a three-dimension coordinate of a pupil may be used as the eye position of the driver. In another example, a midpoint of three-dimensional coordinates of the inner and outer eye corners may be determined as the eye position of the driver.

The eye position and the head posture direction of the driver may be determined based on the face image of the driver and the parameter of the on-vehicle imager, thereby realizing to determine a current range of field of view of the driver.

At block S203, the projection position of the on-vehicle projection device is determined based on the eye position, the head posture direction of the driver and the installation position of the on-vehicle projection device.

The range of field of view of the driver may be determined based on the eye position and the head posture direction of the driver. Therefore, the projection position of the on-vehicle projection device may be determined correspondingly and the on-vehicle projection device may be adjusted, such that the projection position matches the range of field of view of the driver.

In an example, the block S203 may include the following.

A. A vision determination request of the driver is sent to a server. The vision determination request of the driver may include the face image of the driver and the parameter of the on-vehicle imager, and may be used to instruct the server to determine the eye position and the head posture direction of the driver and to receive the eye position and the head posture direction of the driver returned by the server.

B. A target intersection position between the head posture direction starting from the eye position of the driver and an on-vehicle front windshield may be determined.

The range of field of view of the driver is within the on-vehicle front windshield. A straight line in three-dimension space is extended starting from the eye position of driver along the head posture direction of the driver. The straight line may intersect with the on-vehicle front windshield to form an intersection point, which may be the target intersection point. A three-dimension coordinate of the target intersection point may be obtained based on a three-dimension coordinate of a frame of the on-vehicle front windshield to obtain the target intersection position.

C. The projection position of the on-vehicle projection device may be determined based on the target intersection position.

After the target intersection position is obtained, the projection position of the on-vehicle projection device may be adjusted accordingly based on the target intersection position, such that the projection position may match the target intersection position.

In detail, the projection position of the on-vehicle projection device may be determined based on the target intersection position in the following ways. 1) A projection direction determination request is sent to the on-vehicle projection device. The projection direction determination request may include the target intersection position and be used to instruct the on-vehicle projection device to determine the projection position. 2) The projection position of the on-vehicle projection device is selected based on a relationship between a candidate intersection position and a candidate projection height and/or a candidate projection angle of the on-vehicle projection device based on the target intersection position.

For different types of vehicles, the installation positions of the on-vehicle projection devices are different. The on-vehicle projection device may adjust the projection position based on the target intersection position. After the target intersection position is determined, the projection position of the on-vehicle projection device may be determined accordingly based on the relationship, stored in the system in advance, between the candidate intersection position and the candidate projection height and/or the candidate projection angle of the on-vehicle projection device, such that the projection position matches the target intersection position.

The projection position of the on-vehicle projection device may be determined based on the eye position, the head posture direction of the driver and the installation position of the on-vehicle projection device, thereby realizing automatically adjust the projection of the head-up display to adapt to the field of view of the driver.

With the technical solution according to embodiments of the present disclosure, the eye position and the head posture direction of the driver may be determined based on the face image of the driver and the parameter of the on-vehicle imager, thereby realizing to determine the range of the field of view of the driver. In addition, the projection position of the on-vehicle projection device may be determined based on the eye position, the head posture direction of the driver and the installation position of the on-vehicle projection device, thereby realizing to adjust the projection position based on the field of view of the driver. Therefore, the projection of the head-up display may be adjusted to automatically adapt to the field of view of the driver.

Figure 3:
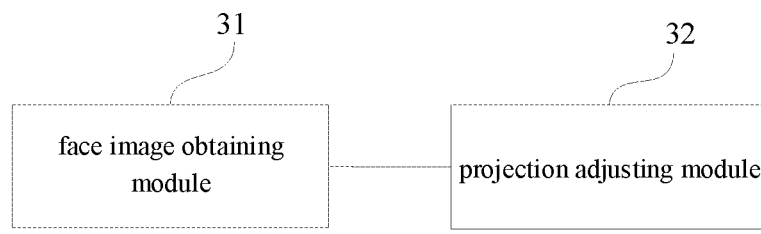
FIG. 3 is a block diagram illustrating an apparatus for adjusting on-vehicle projection according to embodiments of the present disclosure

FIG. 3 is a block diagram illustrating an apparatus for adjusting on-vehicle projection according to embodiments of the present disclosure. The apparatus for adjusting on-vehicle projection may be arranged in a vehicle disposed with an on-vehicle imager, to execute a method for adjusting on-vehicle projection according to any one of embodiments of the present disclosure. The apparatus may have functions modules and beneficial effects corresponding to the executed method. As illustrated in FIG. 3, the apparatus may include: a face-image obtaining module 31 and a projection adjusting module 32.

The face-image obtaining module 31 may be configured to obtain a face image of a driver captured by the on-vehicle imager.

The projection adjusting module 32 may be configured to determine a projection position of an on-vehicle projection device based on the face image of the driver, a parameter of the on-vehicle imager and an installation position of the on-vehicle projection device.

On the basis of the above implementations, the projection adjusting module 32 may be configured to: determine an eye position and a head posture direction of the driver based on the face image of the driver and the parameter of the on-vehicle imager; and determine the projection position of the on-vehicle projection device based on the eye position, the head posture direction of the driver and the installation position of the on-vehicle projection device.

On the basis of the above implementations, the projection adjusting module 32 may be configured to: determine image coordinates of facial feature points of the driver based on the face image of the driver; and determine three-dimension coordinates of the facial feature points of the driver and three-dimension directional vectors of the head posture of the driver based on the image coordinates of the facial feature points of the driver and the parameter of the on-vehicle imager.

On the basis of the above implementations, the projection adjusting module 32 may be further configured to: determine a target intersection position between the head posture direction starting from the eye position of the driver and an on-vehicle front windshield; and determine the projection position of the on-vehicle projection device based on the target intersection position.

On the basis of the above implementations, the projection adjusting module 32 may be further configured to: select the projection position of the on-vehicle projection device based on a relationship between a candidate intersection position and a candidate projection height and/or a candidate projection angle of the on-vehicle projection device and based on the target intersection position.

On the basis of the above implementations, the projection adjusting module 32 may be further configured to: send a vision determination request of the driver to a server. The vision determination request of the driver may include the face image of the driver and the parameter of the on-vehicle imager, and may be used to instruct the server to determine the eye position and the head posture direction of the driver.

In addition, the projection adjusting module 32 may be further configured to determine the projection position of the on-vehicle projection device based on the eye position and the head posture direction of the driver returned by the server and the installation position of the on-vehicle projection device.

On the basis of the above implementations, the projection adjusting module 32 may be further configured to: send a projection direction determination request to the on-vehicle projection device. The projection direction determination request may include the target intersection position and may be used to instruct the on-vehicle projection device to determine the projection position.

In addition, the projection adjusting module 32 may be further configured to obtain the projection position returned by the on-vehicle projection device.

The apparatus for adjusting on-vehicle projection according to embodiments of the present disclosure may execute a method for adjusting on-vehicle projection according to any one of embodiments of the present disclosure, and have the functions modules and beneficial effects corresponding to the executed method. The technical details not described in detail in this embodiment may refer to the method for adjusting on-vehicle projection according to any one of embodiments of the present disclosure.

Figure 4:
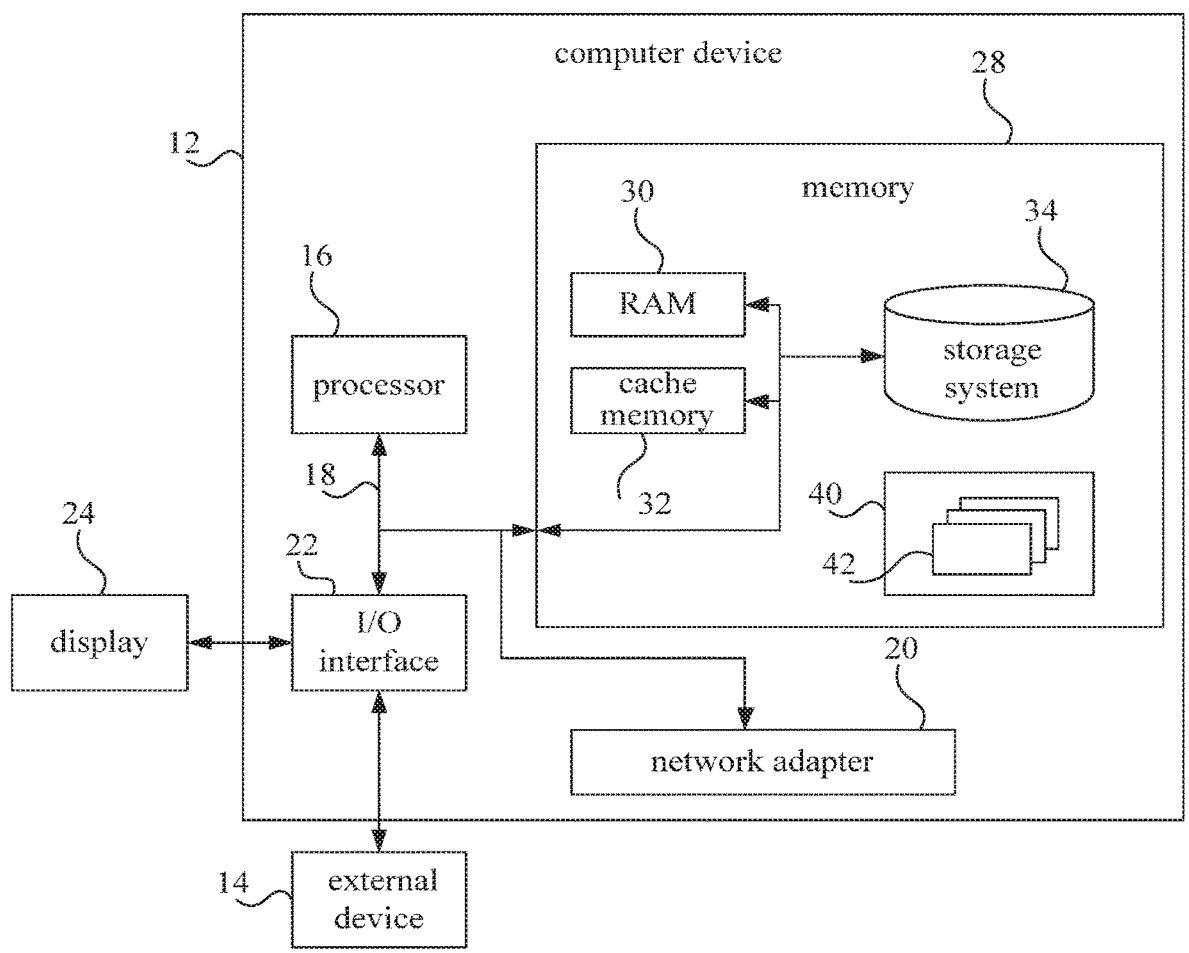
FIG. 4 is a schematic diagram illustrating a device according to embodiments of the present disclosure.

FIG. 4 is a schematic diagram illustrating a device according to embodiments of the present disclosure. FIG. 4 illustrates a block diagram of an exemplary device 400 applicable to implement embodiments of the present disclosure. The device 400 illustrated in FIG. 4 is only an example, which may not limit functions and scope of embodiments of the present disclosure.

As illustrated in FIG. 4, the device 400 is embodied in the form of a general-purpose computing device. Components of the device 400 may include but be not limited to: one or more processors or processing units 401, a system memory 402, and a bus 403 connecting different system components (including the system memory 402 and the processing unit 401).

The bus 403 represents one or more of several bus structures, including a storage bus or a storage controller, a peripheral bus, an accelerated graphics port and a processor or a local bus with any bus structure in the plurality of bus structures. For example, these architectures include but not limited to an industry standard architecture (ISA) bus, a micro channel architecture (MAC) bus, an enhanced ISA bus, a video electronics standards association (VESA) local bus and a peripheral component interconnection (PCI) bus.

The device 400 typically includes a plurality of computer system readable mediums. These mediums may be any usable medium that may be accessed by the device 400, including volatile and non-volatile mediums, removable and non-removable mediums.

The system memory 402 may include computer system readable mediums in the form of volatile medium, such as a random access memory (RAM) 404 and/or a cache memory 405. The device 400 may further include other removable/non-removable, volatile/non-volatile computer system storage mediums. Only as an example, the storage system 406 may be configured to read from and write to non-removable, non-volatile magnetic mediums (not illustrated in FIG. 4, and usually called "a hard disk driver"). Although not illustrated in FIG. 4, a magnetic disk driver configured to read from and write to the removable non-volatile magnetic disc (such as "a diskette"), and an optical disc driver configured to read from and write to a removable non-volatile optical disc (such as a compact disc-read only memory (CD-ROM), a digital video disc-read only memory (DVD-ROM) or other optical mediums) may be provided. Under these circumstances, each driver may be connected with the bus 403 by one or more data medium interfaces. The system memory 402 may include at least one program product. The program product has a set of program modules (such as, at least one program module), and these program modules are configured to execute functions of respective embodiments of the present disclosure.

A program/utility tool 408, having a set (at least one) of program modules 407, may be stored in the system memory 402. Such program modules 407 include, but are not limited to, an operating system, one or more application programs, other program modules, and program data. Each or any combination of these examples may include an implementation of a networking environment. The program module 407 usually executes functions and/or methods described in embodiments of the present disclosure.

The device 400 may communicate with one or more external devices 409 (such as a keyboard, a pointing device, and a display 410), may further communicate with one or more devices enabling a user to interact with the device 400, and/or may communicate with any device (such as a network card, and a modem) enabling the device 400 to communicate with one or more other computing devices. Such communication may occur via an input/output (I/O) interface 411. Moreover, the device 400 may further communicate with one or more networks (such as local area network (LAN), wide area network (WAN) and/or public network, such as Internet) via a network adapter 412. As illustrated in FIG. 4, the network adapter 412 communicates with other modules of the device 400 via the bus 403. It should be understood that, although not illustrated in FIG. 4, other hardware and/or software modules may be used in combination with the device 400, including but not limited to: microcode, device drivers, redundant processing units, external disk drive arrays, RAID (redundant array of independent disks) systems, tape drives, and data backup storage systems, etc.

The processing unit 401 is configured to, by running programs stored in the system memory 402, execute various function applications and data processing, for example a method for adjusting on-vehicle projection according to any of embodiments of the present disclosure. The method includes: obtaining a face image of a driver captured by the on-vehicle imager; and determining a projection position of an on-vehicle projection device based on the face image of the driver, a parameter of the on-vehicle imager and an installation position of the on-vehicle projection device.

Embodiment 5 of the present disclosure provides a computer readable storage medium having a computer program stored thereon. The computer program is configured to implement a method for adjusting on-vehicle projection according to any of embodiments of the present disclosure when executed by a computer processor. The method includes: obtaining a face image of a driver captured by the on-vehicle imager; and determining a projection position of an on-vehicle projection device based on the face image of the driver, a parameter of the on-vehicle imager and an installation position of the on-vehicle projection device.

With the storage medium including computer executable instructions provided by embodiments of the present disclosure, the computer executable instructions are not limited to the above method operation and may also execute a related operation in a method for adjusting projection on a vehicle according to any of embodiments of the present disclosure. The computer storage medium according to any of embodiments of the present disclosure may employ any combination of one or more computer readable mediums. The computer readable medium may be a computer readable signal medium or a computer readable storage medium. The computer readable storage medium may be, for example, but not limited to an electronic, magnetic, optical, electromagnetic, infrared, or semiconductor system, apparatus or device, or any suitable combination of the foregoing. More specific examples (a non-exhaustive list) of the computer readable storage medium may include: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical memory device, a magnetic memory device, or any appropriate combination of the foregoing. In this document, the computer readable storage medium may be any tangible medium that contains or stores a program. The program may be used by or in conjunction with an instruction execution system, apparatus or device.

The computer readable signal medium may include a data signal transmitted in the baseband or as part of a carrier, in which computer readable program codes are carried. The transmitted data signal may employ a plurality of forms, including but not limited to an electromagnetic signal, a light signal or any suitable combination thereof. The computer readable signal medium may further be any computer readable medium other than the computer readable storage medium. The computer readable medium may send, propagate or transmit programs configured to be used by or in combination with an instruction execution system, apparatus or device.

The program codes included in the computer readable medium may be transmitted by any appropriate medium, including but not limited to wireless, electric wire, optical cable, RF (Radio Frequency), or any suitable combination of the foregoing.

The computer program codes for executing operations of the present disclosure may be programmed using one or more programming languages or the combination thereof. The programming languages include object-oriented programming languages, such as Java, Smalltalk, C++, and further include conventional procedural programming languages, such as the C programming language or similar programming languages. The program codes may be executed entirely on a user computer, partly on the user computer, as a stand-alone software package, partly on the user computer and partly on a remote computer, or entirely on the remote computer or server. In the scenario involving the remote computer, the remote computer may be connected to the user computer through any type of network, including a local area network (LAN) or a wide area network (WAN), or may be connected to an external computer (for example, through the Internet using an Internet service provider).

The above is only an optimal embodiment of the present disclosure and technical principle applied thereto. It should be understood by the skilled in the art that, the present disclosure is not limited to the specific embodiment described herein. The skilled in the art may make various obvious changes, modifications and alternatives without departing from the scope of the present disclosure. Therefore, although a detailed illumination is made to the present disclosure by the above embodiments, the present disclosure is not merely limited to the above embodiments. More other equivalent embodiments may also be included without departing from the technical idea of the present disclosure. The scope of the present disclosure is determined by the appended claims.

What is claimed is:

1. A method for adjusting on-vehicle projection, executed by a vehicle disposed with an on-vehicle imager, and a capturing direction of the on-vehicle imager facing toward a driver seat; wherein the method comprises:
    obtaining a face image of a driver captured by the on-vehicle imager;
    determining an eye position of the driver based on the face image and a-parameters of the on-vehicle imager;
    determining image coordinates of facial feature points of the driver based on the face image of the driver;
    converting the image coordinates into three-dimension coordinates based on the parameters of the on-vehicle imager;
    determining three-dimension directional vectors of a head posture based on the three-dimension coordinates;
    determining a straight line starting from the eye position along the three-dimension directional vectors of the head posture, as a head posture direction;
    determining a target intersection position between the head posture direction and an on-vehicle front windshield; and
    determining the projection position of the on-vehicle projection device based on the target intersection position.

2. The method of claim 1, wherein determining the projection position of the on-vehicle projection device based on the target intersection position comprises:
    selecting the projection position of the on-vehicle projection device based on a relationship between a candidate intersection position and a candidate projection height and/or a candidate projection angle of the on-vehicle projection device and based on the target intersection position.

3. The method of claim 1, further comprising:
sending a vision determination request of the driver to a server, the vision determination request of the driver comprising the face image of the driver and the parameter of the on-vehicle imager and being configured to instruct the server to determine the eye position and the head posture direction of the driver; and
determining the projection position of the on-vehicle projection device based on the eye position and the head posture direction returned by the server and the installation position of the on-vehicle projection device.

4. The method of claim 1, wherein determining the projection position of the on-vehicle projection device based on the target intersection position comprises:
sending a projection direction determination request to the on-vehicle projection device, the projection direction determination request comprising the target intersection position and being configured to instruct the on-vehicle projection device to determine the projection position; and
obtaining the projection position returned by the on-vehicle projection device.

5. A device for adjusting on-vehicle projection, arranged in a vehicle disposed with an on-vehicle imager, and a capturing direction of the on-vehicle imager facing toward a driver seat; wherein the device comprises:
one or more processors; and
a storage device, configured to store one or more programs,
wherein when the one or more programs are executed by the one or more processors, the one or more processors are configured to:
obtain a face image of a driver captured by the on-vehicle imager;
determine an eye position of the driver based on the face image and a parameter of the on-vehicle imager;
determine image coordinates of facial feature points of the driver based on the face image of the driver;
convert the image coordinates into three-dimension coordinates based on the parameters of the on-vehicle imager;
determine three-dimension directional vectors of a head posture based on the three-dimension coordinates;
determine a straight line starting from the eye position along the three-dimension directional vectors of the head posture, as a head posture direction;
determine a target intersection position between the head posture direction and an on-vehicle front windshield; and
determine the projection position of the on-vehicle projection device based on the target intersection position.

6. The device of claim 5, wherein the one or more processors are further configured to:
select the projection position of the on-vehicle projection device based on a relationship between a candidate intersection position and a candidate projection height and/or a candidate projection angle of the on-vehicle projection device and based on the target intersection position.

7. The device of claim 5, wherein the one or more processors are further configured to:
send a vision determination request of the driver to a server, the vision determination request of the driver comprising the face image of the driver and the parameter of the on-vehicle imager and being configured to instruct the server to determine the eye position and the head posture direction of the driver; and
determine the projection position of the on-vehicle projection device based on the eye position and the head posture direction of the driver returned by the server and the installation position of the on-vehicle projection device.

8. The device of claim 5, wherein the one or more processors are further configured to:
send a projection direction determination request to the on-vehicle projection device, the projection direction determination request comprising the target intersection position and being configured to instruct the on-vehicle projection device to determine the projection position; and
obtain the projection position returned by the on-vehicle projection device.

9. A non-transitory computer readable storage medium, having a computer program stored thereon, wherein when the computer program is executed by a processor, the method for adjusting on-vehicle projection is executed, the method comprising:
obtaining a face image of a driver captured by an on-vehicle imager, a capturing direction of the on-vehicle imager facing toward a driver seat;
determining an eye position of the driver based on the face image and a parameter of the on-vehicle imager;
determining image coordinates of facial feature points of the driver based on the face image of the driver;
converting the image coordinates into three-dimension coordinates based on the parameters of the on-vehicle imager;
determining three-dimension directional vectors of a head posture based on the three-dimension coordinates;
determining a straight line starting from the eye position along the three-dimension directional vectors of the head posture, as a head posture direction;
determining a target intersection position between the head posture direction and an on-vehicle front windshield; and
determining the projection position of the on-vehicle projection device based on the target intersection position.

10. The non-transitory computer readable storage medium of claim 9, wherein determining the projection position of the on-vehicle projection device based on the target intersection position comprises:
selecting the projection position of the on-vehicle projection device based on a relationship between a candidate intersection position and a candidate projection height and/or a candidate projection angle of the on-vehicle projection device and based on the target intersection position.

11. The non-transitory computer readable storage medium of claim 9, wherein determining the projection position of the on-vehicle projection device based on the eye position, the head posture direction of the driver and the installation position of the on-vehicle projection device comprises:
sending a vision determination request of the driver to a server, the vision determination request of the driver comprising the face image of the driver and the parameter of the on-vehicle imager and being configured to instruct the server to determine the eye position and the head posture direction of the driver; and determining the projection position of the on-vehicle projection device based on the eye position and the head posture direction of the driver returned by the server and the installation position of the on-vehicle projection device.

* * * * *